United States Patent [19]

Wamprecht et al.

[11] Patent Number: 5,902,897

[45] Date of Patent: *May 11, 1999

[54] POLYAMINES AND THEIR USE IN COATING COMPOSITIONS

[75] Inventors: Christian Wamprecht, Neuss; Theodor Engbert, Köln; Holger Casselmann, Bergisch Gladbach; Josef Pedain, Köln; Jürgen Meixner, Krefeld, all of Germany

[73] Assignee: Bayer Aktiengesellschaft, Leverkusen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/684,355

[22] Filed: Jul. 19, 1996

[30] Foreign Application Priority Data

Jul. 25, 1995 [DE] Germany ............... 19527102

[51] Int. Cl.$^6$ .................. C07C 229/26
[52] U.S. Cl. ............ 560/159; 564/153; 564/461; 564/512; 525/421; 525/451; 528/288
[58] Field of Search ............ 560/169; 564/153, 564/461, 512; 525/421, 451; 528/288

[56] References Cited

U.S. PATENT DOCUMENTS

| | | | |
|---|---|---|---|
| 3,715,335 | 2/1973 | Bacskal | 528/288 |
| 4,180,632 | 12/1979 | Ilenda | 521/184 |
| 4,596,844 | 6/1986 | Ohsawa et al. | 523/417 |
| 4,769,436 | 9/1988 | Beck et al. | 528/75 |
| 4,976,837 | 12/1990 | Hughes et al. | 204/181.7 |

FOREIGN PATENT DOCUMENTS

| | | |
|---|---|---|
| 002457 | 6/1979 | European Pat. Off. . |
| 159363 | 10/1985 | European Pat. Off. . |
| 1020790 | 12/1957 | Germany . |

*Primary Examiner*—Richard L. Raymond
*Attorney, Agent, or Firm*—Joseph C. Gil; Thomas W. Roy

[57] ABSTRACT

The present invention relates to polyamines which are prepared by reacting a) unsaturated oligoesters having an average of 2 to 4 double bonds per molecule and b) optionally other unsaturated compounds suitable as Michael addition acceptors and having an average of 1 to 4 double bonds per molecule with c) (cyclo)aliphatic diamines having two primary amino groups and d) optionally other amino-functional compounds suitable as Michael addition donors.

The present invention also relates to the use of these polyamines as a binder component in lacquers and coating compositions, particularly as reactants for blocked polyisocyanates in one-component stoving lacquers.

16 Claims, No Drawings

POLYAMINES AND THEIR USE IN COATING COMPOSITIONS

BACKGROUND OF THE INVENTION

1. Field of the Invention

The present invention relates to new polyamines prepared from (cyclo)aliphatic polyamines and unsaturated oligoesters having an average of 2 to 4 double bonds per molecule, and to their use in combination with blocked polyisocyanates as binders for coating compositions.

2. Description of the Prior Art

Polyhydroxyl compounds, e.g. polyester polyols or polyacrylate polyols, are used as reactants for blocked polyisocyanates in storage-stable one-component stoving lacquers. There have been many attempts to reduce the baking temperature of these lacquers, which is approx. 170° C. Suitable catalysts, such as organic tin compounds or tertiary amines, bring about a reduction of the baking temperature to approx. 150° C., but this is not sufficient. The fact that catalysts also catalyze the reverse reaction at excessively high temperatures, which may occur when the baking temperature is exceeded due to production-related reasons, is also a disadvantage.

Although the desired low baking temperature of approx. 120 to 140° C. may be achieved with new blocking agents having a lower unblocking temperature (EP-A 159,117, which corresponds to U.S. Pat. No. 4,976,837), the coating compositions do not usually have sufficient storage stability.

Therefore, there is a need for a co-reactant for blocked polyisocyanates, which can be used for the preparation of one-component polyurethane stoving lacquers and which not only has a high level of reactivity with the blocked polyisocyanates, but also has good storage stability in combination with blocked polyisocyanates.

It is known from U.S. Pat. No. 3,715,335 to react unsaturated polyesters with diamines having a primary and a tertiary amino group, to optionally allow said reaction products to continue to react with diamines having two primary amino groups, and to quaternize the products at the tertiary nitrogen atoms with epichlorohydrin. The resulting products are recommended as additives for the preparation of paper and as flocculation aids.

EP-A 273,243 describes both polyester polyols containing amino and amide groups which are prepared by reacting unsaturated polyester polyols with low molecular weight polyamines having two primary amino groups, and the use of said products for the preparation of poly(urea)urethanes which are particularly suitable as adhesives. The polyester polyols used for the reaction with diamines are the known unsaturated polyester polyols having a relatively high molecular weight and an OH number of about 10 to 500 mg KOH/g. The polyester polyols are obtained by reaction of polyvalent, preferably divalent α,β-unsaturated carboxylic acids and/or their anhydrides with polyol compounds. Modified polyester polyols having an OH number of 50 to 500, preferably 150 to 350 mg KOH/g and a total nitrogen content of 1 to 7 wt. %, preferably 2 to 5.5 wt. %, are described as being particularly suitable for adhesive applications. A weight ratio of polyamine to polyester polyol of 0.5:100 to 30:100, preferably 4:100 to 15:100 should be maintained for modification.

It has now been found that special low molecular weight oligoesters may be prepared either by transesterification of di(cyclo)alkyl esters of maleic or fumaric acid with di-, trior tetraols or by esterification of maleic anhydride, maleic or fumaric acid with di-, tri- or tetraols and monoalcohols. The oligoesters contain a statistical average of 2 to 4 double bonds per molecule and may be reacted, optionally in admixture with other unsaturated compounds, with (cyclo) aliphatic diamines by the Michael addition (addition of CH-acidic compounds and amines to vinyl carbonyl compounds). New polyamines are obtained which, when combined with blocked polyisocyanates, yield storage-stable, one-component binder combinations which require substantially lower baking temperatures for cross-linking when compared to known one-component polyurethane (PUR) binders.

SUMMARY OF THE INVENTION

The present invention relates to polyamines which are prepared by reacting a) unsaturated oligoesters having an average of 2 to 4 double bonds per molecule and b) optionally other unsaturated compounds suitable as Michael addition acceptors and having an average of 1 to 4 double bonds per molecule with c) (cyclo)aliphatic diamines having two primary amino groups and d) optionally other amino-functional compounds suitable as Michael addition donors.

The present invention also relates to the use of these polyamines as a binder component in lacquers and coating compositions, particularly as reactants for blocked polyisocyanates in one-component stoving lacquers.

DETAILED DESCRIPTION OF THE INVENTION

The polyamines according to the invention are prepared from the following constituents:

a) unsaturated oligoesters which contain an average of 2 to 4, preferably 2 to 3 double bonds per molecule, which are prepared either by transesterification of di(cyclo)alkyl esters of maleic and/or fumaric acid with di-, tri- and/or tetraols or by esterification of maleic anhydride, maleic acid and/or fumaric acid with di-, tri- and/or tetraols and monoalcohols, and which act as Michael addition acceptors, b) optionally other unsaturated compounds which act as Michael addition acceptors, c) (cyclo)aliphatic diamines which have two primary amino groups ($NH_2$) and act as Michael addition donors, and d) optionally other aminofunctional compounds which act as Michael addition donors.

Di(cyclo)alkyl esters of maleic and fumaric acid suitable for transesterification have 1 to 8 carbon atoms in the (cyclo)alkyl group. Examples include dimethyl maleate, diethyl maleate, di-n-propyl maleate, diisopropyl maleate, di-n-butyl maleate, diisobutyl maleate, di-n-hexyl maleate, di-2-ethylhexyl maleate, dicyclohexyl maleate and the corresponding diesters of fumaric acid. Dimethyl-, diethyl- and di-n-butyl maleate are preferred.

Di-, tri- and/or tetraols suitable for transesterification are linear or branched, saturated alcohols optionally containing ether oxygen atoms. Examples include ethylene glycol, propylene 1,2- and 1,3-glycol, butylene 1,4-, 1,3- and 2,3-glycol, hexane 1,6- and 2,5-diol, octane 1,8-diol, 2-methylpropane-1,3-diol, 2-ethyl-2-butylpropane-1,3-diol, neopentyl glycol, 1,4-bis-hydroxymethylcyclohexane, glycerol, trimethylolpropane, pentaerythritol, diethylene glycol, triethylene glycol, tetraethylene glycol and other polyethylene glycols having a molecular weight of 1,000 or less, preferably 800 or less and more preferably 600 or less. Particularly preferred are ethylene glycol, propylene glycol, diethylene glycol, polyethylene glycols having a molecular weight of 600 or less, butane-1,4-diol, hexane 1,6-diol, neopentyl glycol, 1,4-cyclohexane dimethanol and trimethylolpropane.

During transesterification, the di-, tri- and/or tetraols are used in such quantities per mole of di(cyclo)alkyl esters of maleic and/or fumaric acid that there is one mole of di(cyclo)alkyl ester of maleic and/or fumaric acid for every OH group of the alcohol component.

Transesterification is carried out without solvent, at temperatures of 80 to 250° C., preferably 100 to 220° C. The monoalcohol by-product is distilled off. Transesterification catalysts, which may advantageously be used for this reaction, include acids, bases and organometallic compounds such as tin-II-dioctoate. Transesterification generally takes place almost quantitatively.

Maleic anhydride is the preferred carboxylic acid component for the preparation of unsaturated oligoesters by esterification of maleic anhydride, maleic acid and/or fumaric acid with di-, tri- and/or tetraols and monoalcohols.

Di-, tri- and/or tetraols suitable for esterification are those compounds that have previously been described as suitable for transesterification.

Suitable monoalcohols for esterification include aliphatic, cycloaliphatic or araliphatic alcohols having 1 to 18, preferably 1 to 12 and more preferably 1 to 9 carbon atoms, such as methanol, ethanol, 1- and 2-propanol, 1- and 2-butanol, isobutanol, tert.-butanol, 1-,2- and 3-pentanol, 2-and 3-methyl-1-butanol, 2,2-dimethylpropanol, 1-, 2- and 3-hexanol, 4-methyl-2-pentanol, 2-ethyl-1-butanol, 2,2-diethylpropanol, 1-octanol, 2-ethyl-1-hexanol, 1-nonanol, 3,5,5-trimethyl-1-hexanol, 1-decanol, 1-dodecanol, 1-tetradecanol, 1-hexadecanol, 1-octadecanol, cyclohexanol, 2-, 3- and 4-methylcyclohexanol, hydroxymethylcyclo-hexane, 3,3,5-trimethylcyclohexanol, 4-tert.-butylcyclohexanol and benzyl alcohol. Mixtures of these monoalcohols and the corresponding monoalcohols containing ether oxygen atoms may also be used.

Esterification takes place either with or without solvent at temperatures of 80 to 260° C., preferably 100 to 240° C. Water of reaction is optionally distilled off under vacuum or under a stream of nitrogen or removed azeotropically with an entrainer such as benzene, toluene, xylene, isooctane or cyclohexane. Conventional esterification catalysts may be used, for example, acids such as p-toluenesulphonic acid and sulphuric acid or organometallic compounds such as tin-II-dioctoate.

Other unsaturated compounds b), which may optionally be used for the preparation of the polyamines A), include compounds having 1 to 4, preferably 1 to 3 and more preferably 2 to 3 double bonds per molecule. Examples include esters of acrylic and methacrylic acid such as methyl(meth)acrylate, ethyl(meth)acrylate, n-butyl(meth) acrylate, iso-butyl(meth)acrylate, 2-ethylhexyl(meth) acrylate, cyclohexyl(meth)acrylate, ethanediol di(meth) acrylate, butanediol di(meth)acrylate, hexanediol di(meth) acrylate, trimethylolpropane tri(meth)acrylate and pentaerythritol tetra(meth)acrylate and the di(cyclo)alkyl esters of maleic or fumaric acid that have previously been described as suitable for the transesterification reaction. Esterification products of acrylic and/or methacrylic acid with ether alcohols containing up to 4 oxygen atoms, such as polyethylene glycols having a molecular weight of 1,000 or less are suitable as component b).

Di- and trifunctional unsaturated compounds are preferred such as ethanediol di(meth)acrylate, butanediol di(meth)acrylate, hexanediol di(meth)acrylate, trimethylolpropane tri(meth)acrylate and esterification products of acrylic and/or methacrylic acid with di- and triols having ether oxygen atoms, e.g. polyethylene glycols having a molecular weight of 800 or less. Especially preferred are ethanediol diacrylate, butanediol diacrylate, hexanediol diacrylate, trimethylolpropane triacrylate and esterification products of acrylic acid with di- and triols having ether oxygen atoms, e.g., polyethylene glycols having a molecular weight of 600 or less. (Cyclo)aliphatic diamines c) are selected from compounds having two primary amino groups corresponding to formula (I)

$$NH_2—R—NH_2 \qquad (I)$$

wherein R represents a $C_2-C_{24}$ aliphatic or $C_3-C_{24}$ cycloaliphatic group. R preferably represents an aliphatic group having 2 to 15, more preferably 2 to 10 carbon atoms, or a cycloaliphatic group having 6 to 12, preferably 6 carbon atoms.

Examples of suitable diamines include 1,2- and 1,3-propylene diamine, 1,4-diaminobutane, 1,6-diaminohexane, 2,2,4-and 2,4,4-trimethyl-1,6-diaminohexane, 1,4-diaminocyclohexane, 5-amino-1-amino-methyl-1,3,3-trimethylcyclohexane (isophorone diamine), bis-(4-aminocyclohexyl)-methane, bis-(4-amino-3-methylcyclohexyl)-methane, 1-amino-1-methyl-3-(4)-aminomethylcyclohexane, bis-(4-am ino-3,5-diethylcyclohexyl)-methane, bis-aminomethyl-hexahydro-4,7-methano-indane, 2,3-, 2,4- and 2,6-diamino-1-methylcyclohexane and mixtures thereof.

Other amino-functional compounds d), which may optionally be used, include aliphatic, cycloaliphatic and/or araliphatic monoamines with a primary or secondary amino group such as methylamine, dimethylamine, ethylamine, diethylamine, 1-aminopropane, di-n-propylamine, 2-aminopropane, diisopropylamine, 1-aminobutane, di-n-butylamine, 2-aminobutane, isobutylamine, diisobutylamine, 1-aminohexane, dodecylamine, octadecylamine, cyclohexylamine, dicyclohexylamine and benzylamine; aliphatic, cycloaliphatic and/or heterocyclic diamines having a primary and a secondary amino group and optionally a tertiary amino group, in which the secondary amino group may also be part of a ring system, such as N-methylethylene diamine, N-methylpropylene diamine, N-(2-aminoethyl)-piperazine and 3-amino-1,2,4-triazole; aliphatic diamines having two primary and at least one secondary amino group, such as diethylenetriamine, triethylene tetramine, tetraethylenepentamine and bis-(3-aminopropyl)-amine; and aliphatic, cycloaliphatic and/or heterocyclic diamines with at least two secondary amino groups such as N,N'-dimethylethylenediamine, N,N'-dimethyl-1,4-diaminocyclohexane and 2,5-dimethylpiperazine.

Polyamines A) are prepared by reacting the unsaturated oligoesters a) and optionally other unsaturated compounds b) with (cyclo)aliphatic diamines c) and optionally other amino-functional compounds d) at 20 to 160° C., preferably 30 to 140° C. and more preferably 40 to 120° C. without solvent or preferably in an inert organic solvent.

Suitable solvents include aromatic hydrocarbons such as toluene, xylene, higher alkyl benzenes and aromatic mixtures such as Solvesso 100, 150 and 200 solvents (Esso AG); esters such as ethyl acetate, n-butyl acetate, methylglycol acetate and methoxypropyl acetate; ketones such as methylethylketone and methylisobutylketone; and mixtures thereof.

Polyamines A) have an average of at least one, preferably at least 2 and more preferably 2 to 4 primary amino groups (NH$_2$), which may be achieved by suitable quantity ratios of the starting components a) to d).

Preferred polyamines A) are prepared from starting components a) to c). They have an average of 1 to 6, preferably 1 to 4 and more preferably 2 to 4 primary amino groups (NH$_2$) and 3 to 12, preferably 3 to 10 and more preferably 4 to 10 secondary amino groups (NH) per molecule. The total nitrogen content (N=14) is 2.04 to 17.41%, preferably 2.82 to 13.63% and more preferably 3.66 to 12.36%. The primary amino group content (NH$_2$=16) is 0.39 to 6.53%, preferably 0.7 to 5.84% and more preferably 1.39 to 5.30% and the secondary amino group content (NH=15) is 1.82 to 10.20%, preferably 2.01 to 9.12% and more preferably 2.61 to 8.28%.

Preferred polyamines A) also include reaction products prepared exclusively from starting components a) and c). They have an average of 2 to 6, preferably 2 to 5 and more preferably 2 to 4 primary amino groups (NH$_2$) and 2 to 12, preferably 2 to 10 and more preferably 2 to 9 secondary amino groups (NH) per molecule. The total nitrogen content (N=14) is 1.92 to 13.79%, preferably 3.11 to 13.79% and more preferably 3.94 to 13.79%. The primary amino group content (NH$_2$) is 0.73 to 7.88%, preferably 1.78 to 7.88% and more preferably 2.25 to 7.88%, and the secondary amino group content (NH=15) is 1.37 to 7.39%, preferably 1.76 to 7.39% and more preferably 2.11 to 7.39%.

The reaction of components a) to d), a) to c), a) and c), and a), c) and d) is optionally carried out in an inert, organic solvent until such time as the theoretical solids content is nearly or completely reached.

Components a) to d) may be metered in any desired sequence. Components a) and b) and components c) and d) may also be added as a mixture. Preferably, components a), b), c) or d), and components a) and b) or c) and d) may be introduced into the reaction vessel together and then the remaining components may be added simultaneously or successively.

The reaction of components a) to d); a) to c); a) and c) and a), c) and d) is preferably carried out such that a charge of component c) or c) and d) is introduced into the reaction vessel optionally in an inert solvent, and then component a) or a) and b) is added in admixture or successively at the chosen reaction temperature. In a preferred embodiment, a charge of component c) is introduced into the reaction vessel in an inert solvent, and component b) is subsequently added at the desired temperature which is optionally kept constant by cooling. Component a) is added after the reaction of components b) and c), the completeness of the reaction is monitored by a solids determination. The reaction mixture is then stirred at the chosen temperature until such time as the theoretical solids content is nearly or completely reached.

If only components a) and c) are reacted together, it is usually optional which components are initially charged to the reactor, optionally in a solvent, and which are added later. Preferably, component c) is initially introduced into the reaction vessel and then component a) is added.

Polyamines A) are viscous or solid, colorless to yellow products that dissolve to form clear solutions in conventional lacquer solvents such as those previously set forth.

Suitable reactants for polyamines A) to prepare cross-linked coatings are blocked polyisocyanates B) prepared from aromatic, aliphatic and cycloaliphatic polyisocyanates, such as 2,3-, 2,4- and 2,6-diisocyanatotoluene, 4,4'- and 2,4'-diisocyanatodiphenylmethane, 1,4-diisocyanatobutane, 1,6-diisocyanatohexane, 1-isocyanato-5-isocyanato-methyl-3,3,5-trimethylcyclohexane (isophorone diisocyanate), 2,3-, 2,4- and 2,6-diisocyanato-1-methylcyclohexane, 1,4-diisocyanato-cyclohexane, 4,4'- and 2,4'-diisocyanatodicyclohexylmethane, 1-isocyanato-3(4)-isocyanatomethyl-1-methylcyclohexane and mixtures thereof.

Preferred blocked polyisocyanates B) are prepared from polyisocyanates derivatives containing biuret groups, allophanate groups, carbodiimide groups, uretdione groups and isocyanurate groups. These polyisocyanate derivatives are prepared, e.g., from the diisocyanate monomers previously set forth. The polyisocyanate derivatives are described, for example, in EP-A 0,003,505, DE-A 1,101,394, US-A 3,358, 010, U.S. Pat. No. 3,903,127, U.S. Pat. No. 4,324,879, U.S. Pat. No. 4,288,586, DE-A 3,100,262, DE-A 3,100,263, DE-A 3,033,860 and DE-A 3,144,672.

For the preparation of the reversibly blocked polyisocyanate component B), the polyisocyanates are reacted with blocking agents such as phenol, $\epsilon$-caprolactam, butanone oxime, acetone oxime, 3,5-dimethyl-pyrazole, triazole, dialkyl esters of malonic acid, acetoacetic esters and secondary amines such as di-n-butylamine or di-2-ethylhexylamine. As a rule, complete blocking of the free isocyanate groups may be achieved.

The blocking reaction of the free isocyanate groups with $\epsilon$-caprolactam or butanone oxime takes place at temperatures of 100 to 130° C. (e.g. DE-A 3,004,876). The presence of catalysts, e.g., organotin compounds or certain tertiary amines such as triethylamine, in quantities of 0.01 to 0.1 wt. %, based on the total mixture, is advantageous.

The blocking reaction with esters of malonic acid and acetoacetic esters takes place in known manner (e.g. DE-A 2,342,603 or 2,550,156) with the aid of basic catalysts such as sodium phenolate, sodium methylate or other alkali alcoholates. Other organic alkali compounds, such as sodium malonate, are also suitable. The catalysts are used in a quantity of 0.1% to 2%, based on the total weight of the reaction components. Dialkyl malonates should be used in a quantity of at least 1 mole per isocyanate equivalent; however, it is advisable to use a 5 to 20% excess of blocking agent.

In principle, it is also possible to only partially block an unblocked polyisocyanate such that, for example, 50 to 95%, preferably 70 to 95% of the isocyanate groups are present in the blocked form, and subsequently to react the partly blocked polyisocyanate with polyamine component A). The preparation of compositions containing components A) and B) may take place in the same manner or by mixing the individual components. In addition, unblocked polyisocyanates or polyisocyanate mixtures may be partially blocked so that up to, for example, 30% of the NCO groups are present in free, unblocked form.

Polyamines A) are subsequently added in a quantity such that after the spontaneous addition reaction between the free NCO groups and a portion of the amino groups, a mixture of blocked polyisocyanates and excess polyamine A) is present. The equivalent ratio of blocked NCO groups to amino groups is 0.5:1 to 8:1.

The blocking reaction may take place with or without solvents that are inert towards polyisocyanates, such as ethyl acetate, butyl acetate, methoxypropyl acetate, methylglycol acetate, ethylglycol acetate, diethyleneglycol monomethyl-ether acetate, methylethylketone, methylisobutylketone, toluene, xylene and the known higher-boiling hydrocarbon mixtures used in lacquer chemistry. The solvents may be used individually or as mixtures. It is also possible to use plasticizers instead of solvents, such as commercially available phosphates, phthalates or sulphonates.

Blocked polyisocyanates which may be used according to the invention as cross-linking component B), are known and disclosed, e.g., in DE-A 2,342,603, 2,436,872, 2,550,156, 2,612,783, 2,612,784 or 2,612,785.

Polyamines A) are optionally used in admixture with the known organic polyhydroxyl compounds C) as reactants for the blocked polyisocyanates B). The polyhydroxyl compounds are selected from known polyester, polyether, polycarbonate, polyurethane or polyacrylate polyols, preferably polyester and polyacrylate polyols.

Suitable polyester polyols include polycondensates of organic hydroxyl compounds which are soluble in the previously mentioned lacquer solvents. The polyesters are prepared by reacting monoalcohols such as n-butanol, 2-ethylhexanol and cyclohexanol; diols such as ethane 1,2-diol, propane 1,2- and 1,3-diol, butane 1,4- and 1,3-diol, neopentylglycol, hexane 1,6-diol and 1,4-cyclohexanedimethanol; and/or higher functional alcohols such as glycerol, trimethylolpropane and pentaerythritol with organic carboxylic acids, e.g., monocarboxylic acids such as benzoic acid, cyclohexanoic acid and 2-ethylhexanoic acid; dicarboxylic acids and their anhydrides such as phthalic acid (anhydride), maleic acid (anhydride), isophthalic acid and adipic acid; and higher functional carboxylic acids such as 1,2,4-benzene tricarboxylic acid (anhydride). The hydroxyl group content of these polyester polyols is generally 0.5 to 9 wt. % (based on resin solids).

Suitable polyacrylate polyols include copolymers of hydroxyl group-containing monomers with other olefinically unsaturated monomers that are soluble in the previously disclosed solvents, such as butyl-acrylate, 2-ethylhexylacrylate, methylmethacrylate, styrene, acrylic acid and acrylonitrile. Suitable hydroxyl group-containing monomers include, in particular, 2-hydroxyethyl(meth) acrylate and the hydroxypropyl(meth)-acrylate isomer mixture obtained by adding propylene oxide to acrylic acid or methacrylic acid. The hydroxyl group content of these polyacrylate polyols is generally 0.5 to 7 wt. % (based on resin solids).

The polyamines may be mixed with organic polyhydroxyl compounds in an equivalent ratio of $NH_2$ to OH groups of 1:9 to 9:1 preferably 1:7 to 7:1. More preferably, polyamines A) are used as the sole reactant for blocked polyisocyanates B).

In the binders contained in the coating compositions according to the invention, the polyamine component A) and the blocked polyisocyanate component B) are mixed in an equivalent ratio of blocked isocyanate groups to primary amino groups of 0.5:1 to 8:1, preferably 0.6:1 to 6:1 and more preferably 0.7:1 to 4:1. The components are mixed at temperatures below the temperature at which the blocked isocyanate groups react with the amino groups.

Apart from binder components A) and B), the coating compositions according to the invention may contain the above-mentioned polyhydroxyl components C) and other known additives, e.g., solvents having a boiling range of at least 75° C. The upper limit of the boiling point or the boiling range of the optional solvents optionally depends upon the relevant baking conditions, i.e. the higher the baking temperature, the higher the boiling temperature of the solvent or solvent mixture.

Suitable solvents include aromatic hydrocarbons such as toluene, xylene, ethylbenzene, tetralin, cumene and commercially available mixtures of aromatics having narrow boiling ranges, e.g., Solvesso 100, 150 and 200 solvents from Esso AG; ketones such as methylisobutyl-ketone, diisobutylketone and isophorone; esters such as ethyl acetate, propyl acetate, isopropyl acetate, butyl acetate, methoxypropyl acetate, ethyl- and butylglycol acetate, hexyl acetate, dimethyl succinate, dimethyl glutarate and dimethyl adipate; and mixtures of these solvents.

Other optional additives include plasticizers such as tricresyl phosphate or diphthlates and chloroparaffins; pigments and extenders such as titanium dioxide, barium sulphate, chalk and carbon black; catalysts such as N,N-dimethylbenzylamine, N-methylmorpholine, tin-II and zinc-II octoate and dibutyltin dilaurate; levelling agents; thickeners; stabilizers such as substituted phenols; organofunctional silanes as adhesion promotors; and light stabilizers.

Light stabilizers include the sterically hindered amines described in DE-A 2,417,353 (=U.S. Pat. No. 4,123,418 and U.S. Pat. No. 4,110,304) and DE-A 2,456,864 (=U.S. Pat. No. 3,993,655 and U.S. Pat. No. 4,221,701). Particularly preferred light stabilizers include bis-(1,2,2,6,6-pentamethyl-piperidyl-4)-sebacate, bis-(2,2,6,6-tetramethylpiperidyl-4)-sebacate, n-butyl-(3,5-di-tert. butyl-4-hydroxybenzyl)-malonic acid-bis-(1,2,2,6,6-pentamethylpiperidyl4)-ester.

The coating compositions according to the invention are mixtures that are liquid at room temperature and have very good storage stability.

To prepare coatings from the coating compositions according to the invention, the compositions are applied to any heat-resistant substrates in one o more coats using known methods, for example, by spraying, immersion, flow coating or with the aid of rollers or blades. The coating compositions are suitable coating metal, plastics, wood or glass. The coating compositions are particularly suitable for the preparation of coatings on motor vehicle body parts, particularly as surfacers and top coats.

Another preferred field of application is the preparation of coatings on aluminum and steel strips which are coated by the automatic strip lacquering process and are used as motor vehicle bodies, housings for machines and domestic appliances, coating sheets, drums and containers.

The substrates to be coated may be provided with suitable primers before coating. The coating compositions are generally applied such that dry coat thicknesses of approx. 5 to 80 $\mu$m, preferably 10 to 60 $\mu$m, are obtained. However, it is also possible to prepare substantially thicker coats.

Depending upon the application, the coating compositions according to the invention are cured at a temperature of 90 to 400° C., preferably 100 to 350° C. and more preferably 110 to 160° C., for 0.25 to 45 minutes, preferably 0.50 to 35 minutes.

A particular advantage of the binder compositions according to the invention compared with known polyurethane coating compositions lies in the lower baking temperatures and shorter baking times needed to obtain solvent-resistant coatings without catalysts.

The cured coatings have outstanding properties and may be used in many applications, especially in coil coating lacquers for outdoor weathering-resistant one- and two-component lacquers, and in the motor vehicle sector as surfacers and top coats.

The invention is further illustrated but is not intended to be limited by the following examples in which all parts and percentages are by weight unless otherwise specified.

EXAMPLES

Viscosities were determined in accordance with
DIN 53 019

I. General preparation procedure for unsaturated oligoesters a)

Maleic anhydride and the diol or polyol set forth in Table 1 were weighed into a three-necked flask equipped with stirrer, reflux condenser, thermometer and nitrogen feed and stirred at 80 to 150° C. until the anhydride band at approx. 1845 $cm^{-1}$ in the IR spectrum had nearly or completely disappeared. The monoalcohol set forth in Table 1, an esterification catalyst and a water entrainer were then added. The addition takes place at a temperature below the boiling point of the monoalcohol and of the entrainer. The mixture was then boiled with the use of a water separator until the theoretical quantity of water had been separated, or until no more water separated. The entrainer and, if necessary, excess monoalcohol were then completely distilled off under vacuum. The unsaturated oligoester remained as a colorless to slightly yellowish, low-viscosity fluid. The composition and properties of the resulting unsaturated oligoesters are set forth in Table 1.

TABLE 1

Compositions and properties of unsaturated oligoesters a), weight of ingredients in g

| Example | 1 | 2 | 3 | 4 | 5 | 6 | 7 |
|---|---|---|---|---|---|---|---|
| Maleic anhydride | 196 | 196 | 196 | 735 | 882 | 392 | 392 |
| Butane 1,4-diol | — | — | 90 | — | — | — | — |
| Neopentylglycol | — | 104 | — | — | — | — | — |
| Hexane 1,6-diol | 118 | — | — | 442 | — | — | 118 |
| Polyethylene glycol MW: 300 | — | — | — | — | — | 600 | 300 |
| Trimethylolpropane | — | — | — | — | 402 | — | — |
| n-Butanol | 259 | 178 | 178 | 666 | 799 | 356 | 356 |
| p-Toluene sulphonic acid | — | 4.8 | 2.3 | 4.6 | 7.4 | 6.4 | 5.5 |
| Conc. sulphuric acid | 3.6 | — | — | — | — | — | — |
| Toluene | 135 | — | — | — | — | — | — |
| Cyclohexane | — | 135 | 100 | 200 | 250 | 400 | 400 |
| Acid value (mg KOH/g) | 2.4 | 2.9 | 2.3 | 1.3 | 2.3 | 9.0 | 4.5 |
| Viscosity at 23° C., mPa · s (DIN 53 019) | 69 | 72 | 54 | 61 | 324 | 117 | 83 |

II. General preparation procedure for polyamines A)

Part I was introduced into a 3 liter 4-necked flask equipped with stirrer, reflux condenser, thermometer and nitrogen feed and heated to 60–80° C. Part II was then added within 1 hour. If part II was an unsaturated acrylate b), stirring was carried out for 1 hour at 80° C., then part III was added in 1 hour and stirring was carried out at 80° C. until the theoretical solids content was reached. If part II was an unsaturated oligoester a), stirring was carried out at 80° C. until the theoretical solids content was reached and then, if used, part III was added within 1 hour and stirring was then carried out at 80° C. until the theoretical solids content was reached. The mixture was then cooled to room temperature and polyamines A) were obtained as slightly yellowish solutions.

The composition and properties of the resulting polyamines according to the invention are set forth Table 2 and Table 3, respectively.

TABLE 2

Compositions of the polyamines A) according to the invention, weight of sample in g

| Polyamines | A1 | A2 | A3 | A4 | A5 | A6 | A7 |
|---|---|---|---|---|---|---|---|
| Part I | | | | | | | |
| Butyl acetate | 600 | 600 | 600 | 600 | 600 | 600 | 600 |
| Isophorone diamine | — | 640 | — | 512 | 596 | 555 | 591 |
| 4,4'-Diaminodi-cyclohexylmethane | 586 | — | 713 | — | — | — | — |
| Part II | | | | | | | |
| Trimethylolpropane triacrylate | — | 318 | 287 | — | 207 | 277 | 295 |
| Unsaturated oligo-esters from example 5 | 475 | — | — | 514 | — | — | — |
| Part III | | | | | | | |
| Unsaturated oligo-esters from example | | | | | | | |
| 1 | 339 | — | — | — | — | — | — |
| 2 | — | 442 | 400 | — | — | — | — |
| 3 | — | — | — | 374 | — | — | — |
| 4 | — | — | — | — | 597 | — | — |
| 6 | — | — | — | — | — | 568 | — |
| 7 | — | — | — | — | — | — | 514 |

TABLE 3

Properties data of polyamines A)

| Polyamines | A1 | A2 | A3 | A4 | A5 | A6 | A7 |
|---|---|---|---|---|---|---|---|
| Solids content % | 69.5 | 69.8 | 69.7 | 70.6 | 69.5 | 70.4 | 68.9 |
| Viscosity at 23° C., mPa · s (DIN 53 019) | 2354 | 915 | 1214 | 2110 | 618 | 1003 | 1126 |
| Amine value, mg KOH/g | 155 | 210 | 189 | 165 | 221 | 186 | 200 |
| Equivalent weight g/mol NH$_2$ + NH | 361 | 267 | 296 | 339 | 254 | 301 | 280 |
| Equivalent weight g/mol NH$_2$ | 1264 | 934 | 1035 | 1186 | 889 | 1054 | 980 |

COMPARISON EXAMPLE 1 (V1)

In order to determine the suitability of polyester polyols containing amino and amide groups according to EP-A 273,243 (U.S. Pat. No. 4,769,436) as a binder component in polyurethane coatings, Example 1 of this patent was repeated exactly. A reddish-brown product having a viscosity at 20° C. of 53,742 mPa.s was obtained. The resin had a total nitrogen content of 3.6% and a basic nitrogen content of 1.43% (equivalent weight approx. 1049 g/mole basic nitrogen).

COMPARISON EXAMPLE 2 (V2)

In order to compare the reactivity of the polyamines according to the invention with that of polyester polyols, a commercially available polyester polyol was selected (i.e., Alkynol 1665, a commercial product from Bayer AG). This polyol in combination with blocked polyisocyanates is particularly suitable for the preparation of stoving lacquers such as primers, automobile surfacers and coil coating and general industrial coatings. The resin was present as a 65% solution in a 31.5:3.5 mixture of Solvesso 100 solvent and isobutanol and had a viscosity of approx. 2,700 mpa.s, a hydroxyl group content of approx. 1.7% (based on solution and an equivalent weight of 1000 g/mole OH groups.

III. Preparation of coating compositions

Polyamines A1 to A7 and the binders from comparison examples VI and V2 were mixed with blocked polyisocyanates, which are described in more detail below, such that the equivalent ratio of $NH_2$ and OH groups to blocked isocyanate groups was 1:1. The mixtures were adjusted to a viscosity of approx. 30 s run-out time from a DIN 4 mm cup (DIN 53211) by adding a solvent mixture, and were subsequently applied with a film spreader to test plates at a wet film thickness of approx. 100 pm. After aerating for 5 minutes at room temperature, the coated test plates were cured for 30 minutes at 130° C. and 140° C. and then cooled to room temperature. The optical and mechanical properties and solvent resistance of the resulting coatings were evaluated below as a function of the degree of crosslinking.

The solvent resistance was tested by applying a swab soaked in a solvent to the coatings for one minute. The solvents used were xylene, methoxypropyl acetate (MPA), ethyl acetate and acetone. After one minute the coatings were evaluated. A value of "0" means that the coating was completely satisfactory, while a value of "5" means that the coating was completely dissolved at the place of contact.

The mechanical lacquer properties were characterized by the Konig pendulum damping test (DIN 53 157) which is a measure of the hardness of the coating, and the Erichsen cupping test (DIN ISO 1520), which is a measure of the flexibility of the coating.

The compositions of binder compositions 1 to 7 and comparison examples V8 to V10 and the test results are set forth in Table 4.

TABLE 4

Compositions and test results of coatings based on polyamines A1 to A7 and comparison examples V1 and V2. Quantities in g.

| Example | 1 | 2 | 3 | 4 | 5 | 6 | 7 | 8 | 9 | 10 |
|---|---|---|---|---|---|---|---|---|---|---|
| Polyamine | 126.4 A1 | 93.4 A2 | 103.5 A3 | 118.6 A4 | 88.9 A5 | 105.4 A6 | 98.0 A7 | — | — | — |
| Comparison product | — | — | — | — | — | — | — | 104.9 V1 | 100.0 V2 | 100.0 V2 |
| Blocked Polyisocyanate 1[1)] | | | | | | 37.8 | 37.8 | | 37.8 | 37.8 |
| Blocked Polyisocyanate 2[2)] | 51.9 | 51.9 | 51.9 | 51.9 | 51.9 | — | — | 51.9 | — | — |
| Butylacetate/MPA/ xylene 1:1:1 | 90.0 | 58.0 | 73.0 | 62.0 | 55.0 | 45.0 | 48.0 | 63.0 | 60.0 | 60.0 |
| Baking temp. (° C.) 30 min | 140 | 140 | 140 | 140 | 140 | 130 | 130 | 140 | 130 | 140 |
| Opt. film properties (flow) | v.gd | v.gd | v.gd | v.gd | v.gd | v.gd | v.gd. | good[3)] | good[4)] | good[4)] |
| Pendulum damping test(s) | 163 | 191 | 197 | 177 | 187 | 161 | 168 | too soft | 73 | 190 |
| Erichsen cupping Partial dissolution 1 min | 10.0 | 7.5 | 6.5 | 8.0 | 9.0 | 9.0 | 8.0 | >10.0 | >10.0 | >10.0 |
| Xylene | 0 | 0 | 0 | 0 | 0 | 0 | 0 | 5 | 3 | 2 |
| MPA | 0 | 0 | 0 | 0 | 0 | 0 | 0 | 5 | 3 | 1 |
| Ethyl acetate | 0 | 1 | 0 | 1 | 1 | 0 | 0 | 5 | 4 | 4 |
| Acetone | 0 | 2 | 1 | 1 | 1 | 1 | 1 | 5 | 4 | 4 |

[1)]Desmodur BL 3175, available from Bayer AG; 75% in solvent naphtha 100 solvent; blocked NCO content: approx. 11.1%; equivalent weight: approx. 378 /mol bl. NCO
[2)]Desmodur BL 4165, available from Bayer AG; 65% in solvent naphtha 100 solvent; blocked NCO content: approx. 8.1%; equivalent weight: approx. 519 /mol bl. NCO
[3)]Deep yellow colored, very soft film
[4)]Colorless film with slight orange-peel structure.

Discussion of the results

Very glossy coatings with very good flow characteristics were prepared from the coating compositions based on polyamines Al to A7 according to the invention. The coatings also possessed good hardness and good flexibility after baking for 30 minutes at both 130° C. and 140° C. The resistance to various solvents was mostly very good, but sometimes only good.

After 30 minutes at 140° C., the coating composition based on comparison example V1 (Example 8) produced a deep yellow, very soft coating which had no resistance at all towards the solvents tested as evidenced by the fact that the coating dissolved or partially dissolved immediately.

At 130° C. (Example 9), the coating composition based on comparison example V2 produced a coating with inadequate film hardness and poor solvent resistance. At a baking temperature of 140° C. (Example 10), a coating was obtained with very good film hardness but inadequate solvent resistance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyamine which is the reaction product of
   a) an unsaturated oligoester which and has an average of 2 to 4 double bonds per molecule and is
      i) the transesterification product of an acid component comprising a member selected from the group consisting of di(cyclo)alkyl esters of maleic and fumaric acid with a hydroxyl component comprising a member selected from the group consisting of diols, triols and tetraols having a molecular weight of 1000 or less or
      ii) the esterification product of an acid component comprising a member selected from the group consisting of maleic anhydride, maleic acid and fumaric acid with a hydroxyl component comprising a member selected from the group consisting of diols, triols and tetrols having a molecular weight of 1000 or less and monoalcohols having 1 to 10 carbon atoms, such that one mole of the acid component is reacted for each hydroxyl group of the hydroxyl component and b) optionally other unsaturated compounds suitable as Michael addition acceptors and having an average of 1 to 4 double bonds per molecule with
   c) (cyclo)aliphatic diamines having two primary amino groups and corresponding to the formula $$NH_2—R—NH_2$$

wherein

R represents a $C_2$–$C_{24}$ aliphatic group or $C_3$–$C_2$, cycloaliphatic group, and d) optionally other amino-functional compounds suitable as Michael addition donors.

2. The polyamine of claim 1 which is the reaction product of components a) to c), has as average of 1 to 6 primary amino groups, 3 to 12 secondary amino groups, a primary amino group content of 0.39 to 6.53% and a secondary amino group content of 1.82 to 10.20%.

3. The polyamine of claim 1 which is the reaction product of components a) and c), has an average of 2 to 6 primary amino groups, 2 to 12 secondary amino groups, a primary amino group content of 0.73 to 7.88% and a secondary amino group content of 1.37 to 7.39%.

4. The polyamine of claim 1 wherein starting component a) is an unsaturated oligoester prepared from maleic anhydride, diols having a molecular weight of 1,000 or less and monoalcohols having 1 to 10 carbon atoms in the alkyl group, and starting component b) is an ester of acrylic and/or methacrylic acid having 2 to 4 double bonds per molecule.

5. The polyamine of claim 2 wherein starting component a) is an unsaturated oligoester prepared from maleic anhydride, diols having a molecular weight of 1,000 or less and monoalcohols having 1 to 10 carbon atoms in the alkyl group, and starting component b) is an ester of acrylic and/or methacrylic acid having 2 to 4 double bonds per molecule.

6. The polyamine of claim 1 wherein starting component a) is an unsaturated oligoester prepared from maleic anhydride, di-, tri- and/or tetraols having a molecular weight of 1,000 or less and monoalcohols having 1 to 10 carbon atoms in the alkyl group.

7. The polyamine of claim 2 wherein starting component a) is an unsaturated oligoester prepared from maleic anhydride, di-, tri- and/or tetraols having a molecular weight of 1,000 or less and monoalcohols having 1 to 10 carbon atoms in the alkyl group.

8. The polyamine of claim 1 wherein component b) comprises trimethylolpropane triacrylate.

9. The polyamine of claim 2 wherein component b) comprises trimethylolpropane triacrylate.

10. The polyamine of claim 3 wherein component b) comprises trimethylolpropane triacrylate.

11. The polyamine of claim 1 wherein component c) comprises isophorone diamine.

12. The polyamine of claim 5 wherein component c) comprises isophorone diamine.

13. The polyamine of claim 7 wherein component c) comprises isophorone diamine.

14. The polyamine of claim 8 wherein component c) comprises isophorone diamine.

15. The polyamine of claim 9 wherein component c) comprises isophorone diamine.

16. The polyamine of claim 10 wherein component c) comprises isophorone diamine.

* * * * *